US012678892B2

(12) United States Patent
Grossmann et al.

(10) Patent No.: US 12,678,892 B2
(45) Date of Patent: Jul. 14, 2026

(54) METHOD FOR MACHINING A MATERIAL

(71) Applicant: TRUMPF Laser—und Systemtechnik GmbH, Ditzingen (DE)

(72) Inventors: Daniel Grossmann, Schramberg (DE); Marc Sailer, Villingen (DE); Jonas Kleiner, Leonberg (DE)

(73) Assignee: TRUMPF LASER—UND SYSTEMTECHNIK GMBH, Ditzingen (DE)

( * ) Notice: Subject to any disclaimer, the term of this patent is extended or adjusted under 35 U.S.C. 154(b) by 722 days.

(21) Appl. No.: 18/174,689

(22) Filed: Feb. 27, 2023

(65) Prior Publication Data

US 2023/0211438 A1    Jul. 6, 2023

Related U.S. Application Data

(63) Continuation of application No. PCT/EP2021/072359, filed on Aug. 11, 2021.

(30) Foreign Application Priority Data

Aug. 28, 2020    (DE) ..................... 10 2020 122 598.9

(51) Int. Cl.
B23K 26/00        (2014.01)
B23K 26/0622      (2014.01)
(Continued)

(52) U.S. Cl.
CPC ........ B23K 26/0624 (2015.10); B23K 26/067 (2013.01); B23K 26/36 (2013.01); B23K 26/082 (2015.10)

(58) Field of Classification Search
CPC .............. B23K 26/064; B23K 26/0648; B23K 26/082; B23K 26/38; B23K 26/0624; B23K 2101/40; B23K 26/0626
See application file for complete search history.

(56) References Cited

U.S. PATENT DOCUMENTS 8,680,430 B2 *    3/2014    Unrath ................... B23K 26/40
                                                     219/121.72
8,847,113 B2 *    9/2014    Unrath ................. B23K 26/364
                                                     219/121.81

(Continued)

FOREIGN PATENT DOCUMENTS

EP        3354394 A1    8/2018
EP        3736922 A1    11/2020
(Continued)

*Primary Examiner* — Erin B Saad
(74) *Attorney, Agent, or Firm* — LEYDIG, VOIT & MAYER, LTD.

(57)        ABSTRACT

A method for machining a material using a pulsed laser includes introducing a sequence of laser pulses into the material for machining the material, and synchronizing a start of each sequence with a fundamental frequency of the laser. The sequence of laser pulses comprises at least two different sequence elements that are offset from one another in space and time. Each sequence element comprises an individual laser pulse, a specific succession of individual laser pulses, or a burst of laser pulses. Specific sequence element properties are impressed on each sequence element. The sequence element properties comprise a position of the laser focus of a respective sequence element. The position of the laser focus of each sequence element of the sequence is adapted for each sequence element.

20 Claims, 8 Drawing Sheets

(51) Int. Cl.
    *B23K 26/067*      (2006.01)
    *B23K 26/36*      (2014.01)
    *B23K 26/082*      (2014.01)

(56)            References Cited

U.S. PATENT DOCUMENTS

| | | | |
|---|---|---|---|
| 9,036,247 B2 | 5/2015 | Cordingley et al. | |
| 9,162,319 B2 | 10/2015 | Lubatschowski et al. | |
| 9,486,877 B2 * | 11/2016 | Unrath | B23K 26/03 |
| 9,724,782 B2 * | 8/2017 | Unrath | B23K 26/0622 |
| 9,776,277 B2 | 10/2017 | Kleinert | |
| 10,391,585 B2 | 8/2019 | Unrath et al. | |
| 10,730,783 B2 * | 8/2020 | Akarapu | C03B 33/082 |
| 2007/0199927 A1 | 8/2007 | Gu et al. | |
| 2009/0294422 A1 * | 12/2009 | Lubatschowski | B23K 26/0626 |
| | | | 219/121.72 |
| 2010/0246611 A1 | 9/2010 | Sun | |
| 2018/0062342 A1 * | 3/2018 | Comstock, II | B23K 26/0624 |
| 2019/0101443 A1 * | 4/2019 | Odanaka | G01J 1/4257 |
| 2021/0165234 A1 * | 6/2021 | Tillkorn | G02B 3/0075 |
| 2021/0170530 A1 * | 6/2021 | Kumkar | B23K 26/064 |
| 2023/0211439 A1 * | 7/2023 | Kleiner | B23K 26/0624 |
| | | | 219/121.69 |

FOREIGN PATENT DOCUMENTS

| | | | |
|---|---|---|---|
| JP | 2019532908 A | 11/2019 | |
| KR | 20200090967 A | 7/2020 | |
| WO | WO 2013140993 A1 | 9/2013 | |
| WO | WO 2016005455 A1 | 1/2016 | |

* cited by examiner

Feed

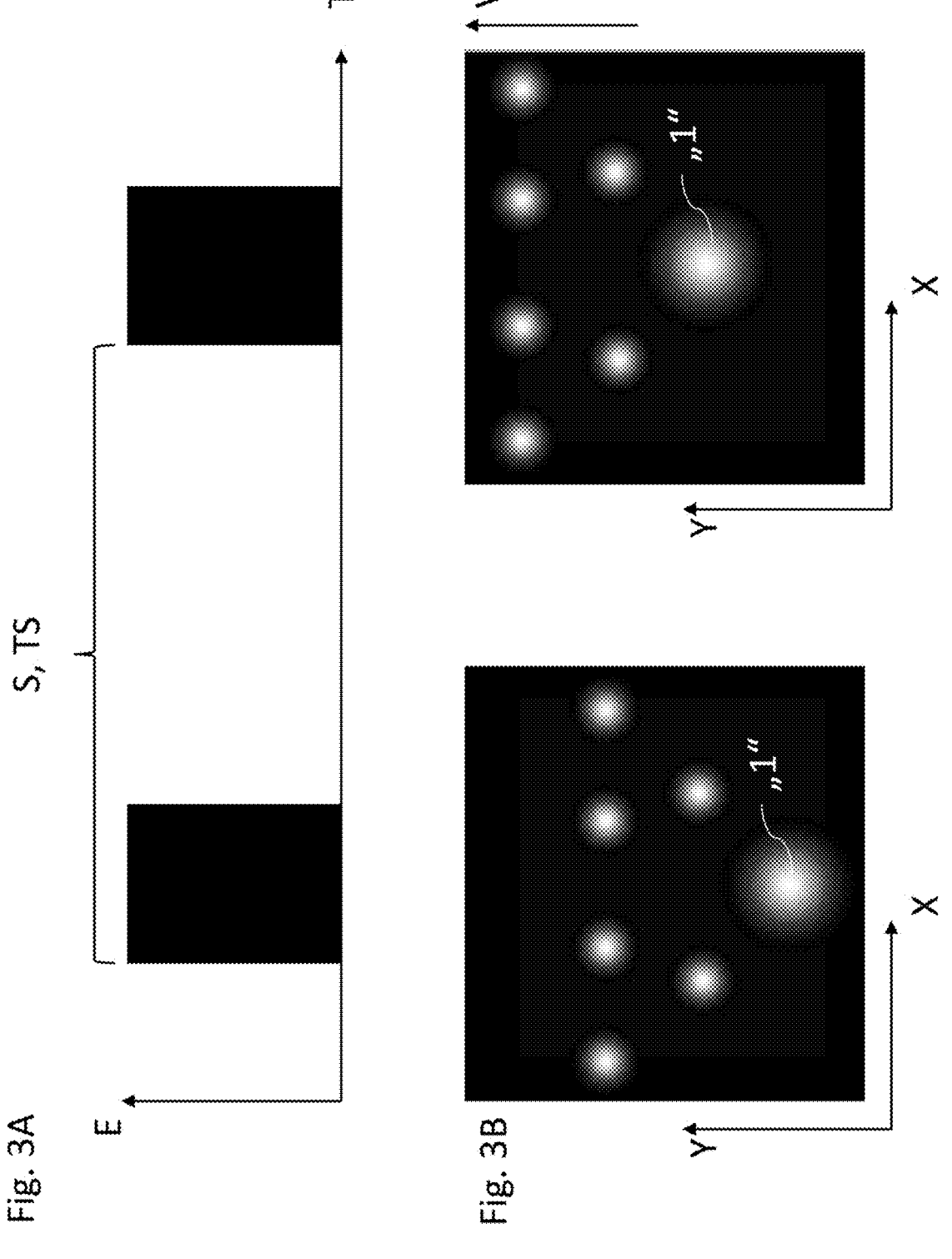

METHOD FOR MACHINING A MATERIAL

CROSS REFERENCE TO RELATED APPLICATIONS

This application is a continuation of International Application No. PCT/EP2021/072359 (WO 2022/043057 A1), filed on Aug. 11, 2021, and claims benefit to German Patent Application No. DE 10 2020 122 598.9 filed on Aug. 28, 2020. The aforementioned applications are hereby incorporated by reference herein.

FIELD

Embodiments of the present invention relate to a method for machining a material by means of laser pulses of a pulsed laser, in particular for machining by means of laser pulses of an ultrashort pulse laser, in the case of which high laser powers can be used for machining purposes.

BACKGROUND

Great demands are usually placed on the cut or trench geometry and the quality of the cut edge in the case of ablation and separation methods based on the introduction of ultrashort laser pulses. A high process throughput should be obtained at the same time.

To meet these demands, focused laser beams are guided over the workpiece along a machining trajectory in the case of the conventional ablation and separation methods. In the process, energy is deposited in the material at different positions, which are determined by a feed, at typically constant time intervals, for example synchronously with the repetition rate of the laser. To optimize these conventional ablation and separation methods, it is possible to modify the machining properties of the focused laser beam by means of beam shaping, and thus for example obtain specifically shaped cut edges with, for example, a great steepness of the cut edge.

The use of acousto-optic deflectors is proposed for the spatial optimization of the energy deposition, for example as disclosed in U.S. Pat. Nos. 9,036,247B2, 9,776,277B2, 10,391,585B2.

SUMMARY

Embodiments of the present invention provide a method for machining a material using a pulsed laser. The method includes introducing a sequence of laser pulses into the material for machining the material, and synchronizing a start of each sequence with a fundamental frequency of the laser. The sequence of laser pulses comprises at least two different sequence elements that are offset from one another in space and time. Each sequence element comprises an individual laser pulse, a specific succession of individual laser pulses, or a burst of laser pulses. Specific sequence element properties are impressed on each sequence element. The sequence element properties comprise a position of the laser focus of a respective sequence element. The position of the laser focus of each sequence element of the sequence is adapted for each sequence element.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIGS. 3A and 3B show a further schematic representation of the method according to some embodiments;

DETAILED DESCRIPTION

Figures 1A, 1B:
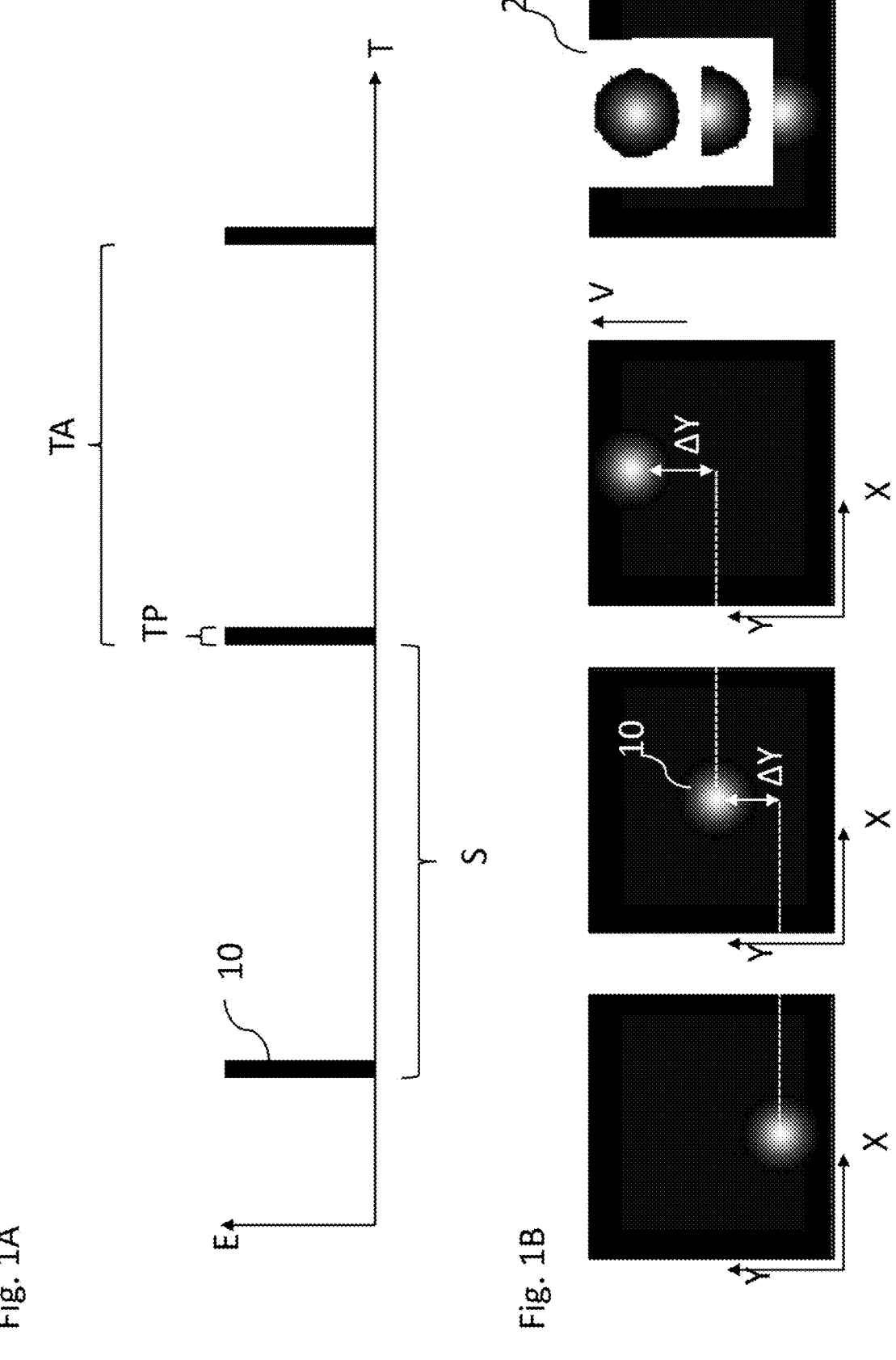
FIGS. 1A and 1B show a schematic representation of a method.

Embodiments of the present invention provide a method for machining a material by means of a pulsed laser, with a sequence of laser pulses being introduced into the material for machining purposes, with the start of each sequence being synchronized with the fundamental frequency of the laser, with the sequence of laser pulses comprising at least two different sequence elements that are offset from one another in space and time, with a sequence element comprising an individual laser pulse, a specific succession of individual laser pulses or a burst of laser pulses, preferably a GHz laser burst, and with specific sequence element properties being impressed on each sequence element. In this case, the sequence element properties comprise the position of the laser focus of a sequence element and the position of the laser focus of each sequence element of the sequence is adapted precisely for each sequence element.

Here, the material to be machined can be a material such as a metal foil, a polymer or a plastic, for example. The material to be machined can also be a semiconductor, for example an elemental semiconductor such as silicon or germanium, or a III-V semiconductor such as gallium arsenide, or an organic semiconductor, or any other type of semiconductor. By way of example, the material can be a silicon wafer. In particular, the material can be a layer system, with each layer being able to be chosen from the group of metals, polymers, plastics or semiconductors.

In this case, the laser provides the laser pulses of the laser beam, with the individual laser pulses forming the laser beam in the beam propagation direction. In particular, the laser can be an ultrashort pulse laser, with the pulse length of the individual laser pulses preferably being shorter than 10 ns, by preference shorter than 500 ps.

Instead of individual laser pulses, the laser can also provide laser bursts, with each burst comprising the emission of a plurality of laser pulses. In this case, the laser pulses can be emitted very shortly after one another, spaced apart by a few picoseconds to nanoseconds, for a specific time interval. In particular, the laser bursts can be GHz bursts, in which the succession of successive laser pulses in the respective burst occurs in the GHz range.

The laser pulses are introduced into the material, as a result of which the material can be machined. In this case, introduction can mean that the energy of the laser beam is at least partially absorbed within the material. Here, the focus of the laser beam can be located in the beam propagation direction above the surface of the material to be machined or under the surface, in the volume of the material to be machined. The focal position can also be located precisely on the surface of the material to be machined.

In particular, the term "focus" can be understood to mean, in general, a targeted intensity boost, with the laser energy converging in a "focal region". In particular, in the following text, the expression "focus" is therefore used independently of the actually used beam shape and the methods for bringing about an intensity boost. The location of the intensity boost along the beam propagation direction can also be influenced by "focusing". By way of example, the intensity boost can be virtually punctiform and the focal region can have a Gaussian intensity cross section, as is provided by a Gaussian laser beam. The intensity boost can also have a linear embodiment, with a Bessel-type focal region arising around the focal position, as may be provided by a non-diffractive beam. Moreover, other more complex beam shapes are also possible, the focal position of which extends in three dimensions, for example a multi-spot profile made of Gaussian laser beams and/or non-Gaussian intensity distributions.

As a result of the energy absorbed from the laser beam, the material heats in accordance with the intensity distribution of the laser and/or transitions into a temporary plasma state on account of the electromagnetic interaction between the laser and the material. In particular, it is thus possible to use not only linear absorption processes but also non-linear absorption processes, which become accessible by the use of high laser energies or laser intensities. Accordingly, the material is modified in the focus of the laser in particular, since the intensity of the laser beam is greatest there. What this can achieve, in particular, is that some of the material can be detached from the material compound, the material for example melting or being evaporated. Hence, machining processes known per se are possible in relation to the interaction between the laser light and the material to be machined, these processes being known as laser drilling, percussion drilling or laser ablation, for example.

Material modifications can also be applied to or introduced into the material as a result of the interaction of the laser with the material to be machined.

A material modification is understood to mean a change in the material that is permanent in the thermal equilibrium of the then machined material, for example the network structure of the material or the (local) density of the material, which causally originates from the local heating generated by the incoming direct laser radiation, and the subsequent cooling and/or electronic relaxation processes.

The material modification in or on the material can here for example be a modification in the structure, in particular the crystalline structure and/or the amorphous structure and/or the chemical structure and/or the mechanical structure, of the material.

The material modification is within the material if it is mainly introduced into the volume of the material. By contrast, the material modification is on the material if the material modification mainly modifies the surface of the material. In particular, a material modification can, however, be introduced into or applied to the material depending on the focal position and the beam profile of the laser beam.

A material modification can also be the direct change of a physical property, for example the strength and/or flexural strength and/or the tolerance of the material with respect to bending forces and shear forces and also shear and tensile stresses. A material modification can also, in particular, be a local change in density, which may depend on the selected material. For example, density variations in the material can cause stress and compression zones which have a higher material hardness than the untreated material. Moreover, two adjacent materials can be interconnected, in particular soldered together, by means of a material modification.

According to the method proposed here, sequences of laser pulses are introduced into the material for the purpose of machining the material, with a sequence comprising at least two different sequence elements. A sequence element may comprise an individual laser pulse, a specific succession of individual laser pulses or a burst of laser pulses, with the burst also being able to be a GHz laser burst. Individual laser pulses and/or successions of individual pulses and/or bursts may also be combined in a sequence element. The laser pulses of the individual sequence elements are initially provided by the pulsed laser.

Specific sequence element properties are impressed on each sequence element. In this case, the sequence element properties for example comprise properties which are defined by the pulsed laser, for example the wavelength or pulse duration. However, the sequence element properties may also comprise properties which are not defined by the pulsed laser itself, but which are impressed by other methods or devices.

In this case, the sequence element property comprises the position of the laser focus of each sequence element, with the position of the laser focus of each sequence element being adapted precisely for each sequence element. In particular, this may mean that the position of the laser focus is adapted precisely for each sequence element in the plane perpendicular to the propagation direction of the laser pulses and/or the position of the laser focus is adapted precisely for each sequence element along the propagation direction, with the result that the laser focus can be positioned freely within an accessible positioning volume.

The laser beam can be focused along the propagation direction by way of appropriate optical elements. During the focusing, the intensity of the laser beam is maximized towards the position of the laser focus. Accordingly, the intensity of the laser beam upstream or downstream of the position of the laser focus in the beam propagation direction is lower than at the position of the laser focus itself. This applies to Gaussian beams in particular, which allow defined focusing. In the case of virtually non-diffractive beams, for example Bessel beams or the experimental implementation thereof, there is no focusing or only little focusing, and so an extended focal range tends to arise in the beam propagation direction rather than a defined focal position.

By displacing the position of the laser focus along the beam propagation direction, it is consequently possible to define the penetration depth of the laser relative to a surface of a material to be machined, with the penetration depth being given by the distance of the focal position from the surface of the material.

By way of appropriate optical elements, it is for example also possible to position the laser beam in a plane perpendicular to the beam propagation direction. By way of example, tilting an optical unit may allow the laser beam to be positioned in a different position to the original position obtained by way of the non-tilted optical unit.

By way of example, a laser beam can also be appropriately deflected by an acousto-optic deflector unit or a scanning unit, for example a galvanometer scanner, with the result that an appropriate positioning of the laser beam perpendicular to the propagation direction of the laser beam can be obtained in this way on the material to be machined. By displacing the position of the laser focus in a plane perpendicular to the beam propagation direction, it is consequently possible to realize an adaptation of the position in a two-dimensional plane for the purpose of adapting the machining of the material.

The adaptation of the position of the laser focus in the plane perpendicular to the beam propagation direction may be restricted to a working region which has a dimension of between 10 and 100 focal diameters for example. Very fast and precise positioning can be obtained by restricting the working region. By way of example, this fast and precise positioning of the laser beam on the material to be machined can be implemented by the use of an acousto-optic deflector unit.

Consequently, the precise site at which the material is machined is defined for each of the at least two sequence elements by the sequence element properties. Hence, laser pulses in a sequence can be introduced into the material to be machined at at least two different positions.

Accordingly, a sequence may form what is known as a multi-segment tool by means of the different focal positions of the individual sequence elements, the said multi-segment tool forming an appropriate form or shape which may serve for machining the material, virtually like a stamp with specified machining positions arranged fixedly with respect to one another. Accordingly, this multi-segment tool provides a specified machining geometry, which comprises the at least two sequence elements at at least two different positions. Hence, it is possible to machine a specified machining geometry over the course of a sequence, and the same positions with the same sequence element properties are always machined over the course of a multiplicity of sequences.

Accordingly, a sequence of laser pulses in this case comprises a specific succession of defined sequence elements, with the entire sequence forming the multi-segment tool. In principle, the sequence elements are already different if the sequence elements differ from one another in terms of one of their sequence element properties.

By way of example, a sequence may comprise three sequence elements. In this case, a first sequence element may comprise an individual laser pulse, with the sequence element properties of the first sequence element for example specifying that the individual laser pulse is focused precisely on the surface of the material to be machined. A second sequence element may comprise a GHz laser burst, with the sequence element properties of the second sequence element for example specifying that the focal position of the GHz laser burst should be located below the surface of the material to be machined. By way of example, a third sequence element may comprise a specific succession of laser pulses, in particular a succession of laser pulses specific in time, similar to a Morse code, that is to say for example the said third sequence element may comprise a number of pulses of different length. By way of example, the sequence element properties of the third sequence element specify that the focal position for the specific succession should be located above the surface of the material to be machined.

By way of example, material modifications can also be produced by means of non-diffractive beams using a multi-segment tool in the case of transparent materials, these material modifications then leading to the separation of the material or to welding of different materials in a second step. However, the multi-segment tool may also bring about a change in the physical properties of the material and, for example, write a nano grating into the material by varying the refractive index of the material.

A sequence element property may also comprise the polarization. In this case, the polarization describes the alignment, in particular the space- or time-varying alignment of the electric field vector of the laser beam relative to the propagation direction of the laser beam. By way of example, a sequence element may have the sequence element property of being s-polarized or p-polarized or circularly polarized or elliptically polarized.

The sequence element properties may be adapted precisely for each sequence element. This means that two directly successive sequence elements may be different and the respective adaptation of the sequence element properties can be carried out precisely for each sequence element. In other words, there is no overlap in the adaptation of the sequence element properties between two different sequence elements.

In particular, a first sequence element may have a first focal position and a directly following second sequence element may have a second focal position. This applies especially even if a sequence element comprises more than one laser pulse of a specific succession of laser pulses.

Consequently, by way of the sequence element precise adaptation of the sequence element properties to the desired process parameters, for example at the full repetition rate of the pulsed laser, it is possible to put together an ablation tool comprising a plurality of laser pulses, by means of which ablation tool the spatial energy introduction can be optimally adapted to the respectively provided machining process.

A further advantage thereof is that, in contrast to pure beam shaping, it is possible to reduce the pulse energy needs since an appropriate beam shape, or the effect thereof, can be emulated by a highly dynamic, sequence element precise displacement of the focal position during the machining.

Furthermore, the sequence element properties may also comprise the pulse energy and/or the intensity, and the pulse energy and/or intensity can be adapted precisely for each sequence element, for all sequence elements.

If the sequence element is an individual laser pulse, the pulse energy is the energy transported by the individual laser pulse. The intensity arises from the quotient of transported laser energy and size of the region in which the laser light experiences an intensity boost.

If the sequence element is a specific succession of individual laser pulses, the pulse energy can be integrally summed over the specific succession of individual laser pulses. A specific succession, for example comprising six individual laser pulses and having a pulse energy totaling 6 microjoules, accordingly comprises, for example, 6 individual laser pulses with an individual energy of 1 microjoule. Therefore, the pulse energy can be defined as if the sequence element were to be an individual laser pulse.

If the sequence element is a GHz laser burst, then the pulse energy can be the energy transported by the entire GHz laser burst.

The pulse energy, that is to say one of the sequence element properties, can be adapted for each sequence element, precisely for each sequence element, meaning that successive sequence elements may have different energies. By way of example, a first sequence element may be an individual laser pulse, which transports an energy of 1 µJ. A second subsequent sequence element may be a 1 GHz laser burst, for example, which comprises a multiplicity of laser pulses and which, integrated, transports an energy of 2 μJ. The same also applies to the laser pulses of a specific succession of pulses.

In particular, the sequence element properties may have a combination of pulse energy and focal position. By way of example, a first sequence element may be an individual laser pulse, which has the sequence element property of transporting an energy of 1 μJ and in the case of which the focal position is located on the surface of the material to be machined. A second sequence element may be a 1 GHz laser burst, which has the sequence element property of transporting an energy of 5 μJ and in the case of which the focal position is located in the volume of the material to be machined.

As a result, it is possible to couple the laser pulse energy to the position of the laser focus. As a result, it is possible to introduce any desired intensity profiles into the material, for example in order to produce different ablation openings and cross sections.

It is also possible for the sequence element properties to comprise the development of the sequence element over time while the sequence element is introduced.

This may mean that the pulse profile of the sequence element varies over time. By way of example, this may refer to the flank steepness of a laser pulse being adjustable in the case of an individual pulse, that is to say that what is known as the increase and decay time of the pulse is able to be adjusted. By way of example, it is consequently possible to realize rectangular pulses or triangular pulses or sawtooth pulses or, in particular, more complex pulse shapes, which may also have a modified pulse duration. By way of example, this can be used to define the amplitude of successive laser pulses in a specific succession of laser pulses or GHz laser bursts.

Preferably, the sequence element properties may comprise the time interval between a sequence element and the preceding and/or subsequent sequence element and the time interval can be adapted for each sequence element of the sequence, the minimum time interval and/or the time interval variation preferably being given by the fundamental frequency of the laser.

The time interval, that is to say a further sequence element property of the sequence elements, is determined from the start of the first sequence element to the start of the further sequence element.

By way of example, the time interval between a first and a second sequence element can be 100 ns and the time interval between the second sequence element and a third sequence element can be 150 ns.

The time interval is measured to the preceding and/or subsequent sequence element. This may mean that the second sequence element is determined relative to a temporal positioning of the first sequence element. The time interval may also be determined relative to a third sequence element. By way of example, a sequence may have a first sequence element and a third sequence element, with the second sequence element being able to be located between the first and the third sequence element. Provided the time interval between the first and the third sequence element has been defined, the description of the time interval between the first and the second sequence element and between the second and the third sequence element are equivalent to one another.

The time interval of the sequence elements can be adapted precisely for each sequence element. In particular, this means that the time interval may vary from sequence element to sequence element between the sequence elements in a sequence. In the case where the sequence element is a specific succession of individual laser pulses, sequence element precise adaptation may mean that each individual laser pulse has a precisely specified time interval in relation to the preceding or the subsequent laser pulse.

Accordingly, an ablation tool may be put together from a plurality of sequence elements, with the energy deposition within this ablation tool not being implemented simultaneously but being adjusted exactly in time in relation to the optimized spatial energy deposition.

By way of example, the time interval between the sequence elements may also be zero, with the result that the laser pulses of the sequence elements are introduced simultaneously into the material. By way of example, it may be only the position of the laser focus that differs between the two sequence elements, with the result that two sequence elements are introduced into the material synchronously.

In this case, the minimum time interval between the sequence elements is given by the fundamental frequency, what is known as the seed frequency, of the pulsed laser. In this case, the seed frequency is the natural repetition frequency of the laser, which corresponds to the undisturbed repetition rate of the laser. Typically, the seed frequency is significantly larger than the spacing between the sequence elements.

Preferably, the sequence element properties furthermore comprise the beam geometry, which is adapted for each sequence element, precisely for each sequence element, with a laser beam formed by the laser pulses of a sequence element preferably being split into at least two partial laser beams, with the partial laser beams particularly preferably being introduced into the material synchronously with respect to one another and/or with the partial laser beams particularly preferably being imaged next to one another and spaced apart from one another along a line.

The beam geometry, that is to say a further sequence element property, in this case for example comprises the spatial design of the intensity distribution of the laser beam.

In particular, the beam geometry comprises the beam profile, for example a Gaussian beam profile or a non-Gaussian beam profile. By way of example, a beam profile may also be elliptical or triangular or linear or have any other shape.

However, the beam geometry also comprises partial laser beams produced from a single laser beam and the spacing thereof from one another. By virtue of the laser beam preferably being split into at least two partial laser beams, the number of laser beams being able to be used to simultaneously machine the material doubles or multiplies, provided the laser energy per partial laser beam is sufficiently high. A beam geometry comprising a plurality of laser foci is also referred to as a multi-spot geometry.

The partial laser beams are preferably introduced synchronously into the material. This may mean that the sequence element properties of the partial laser beams are the same, apart from the position of the laser focus. In particular, the time interval of the two partial laser beams in relation to preceding or subsequent sequence elements are the same size. A synchronous introduction moreover means that both partial laser beams strike the material at the same time.

The partial laser beams may be introduced into the material next to one another. In particular, this means that the partial laser beams are not overlaid. In the case of more than two partial laser beams, this may mean that all partial laser beams are located on a line, in particular a straight line.

A sequence element precise adaptation of the beam geometry means that this sequence element property may be varied from sequence element to sequence element and, for example, from individual pulse to individual pulse. In particular, this means that a first sequence element has a first beam geometry and a second sequence element has a second beam geometry.

Consequently, it is possible to alternate between multi-spot-, line- and individual focus-energy distributions from sequence element to sequence element, for example to deposit some of the energy within the ablation tool into the material synchronously and machine other regions at defined time intervals.

Likewise, this enables an additional optimization of the heat accumulation within the ablation tool. By synchronized positioning of individual laser pulses of the partial laser beams, it is possible to maximize the temporal distance of successive sequence elements in order to minimize the heat influx from the laser into the material.

By combining the various sequence element properties, it is possible to provide a specific ablation tool or a sequence of laser pulses, by means of which material ablation or a separation process can be realized.

In particular, generating various ablation tools allows imitation of the ablation of a shaped laser beam, with the individual sequence elements not being equal to the laser beam to be imitated. Thus, the effect of a beam profile of a desired machining beam can also be shaped by a corresponding distribution of the sequence elements.

Preferably, the sequence element properties are adapted precisely for each pulse for each sequence element, with the adaptation of the sequence element properties preferably being synchronized with the fundamental frequency of the laser.

This means that the respective sequence element properties are specified in defined fashion for each laser pulse and, in particular, different sequence element properties are not impressed on one laser pulse.

The sequence, in particular the start of the sequence, can be synchronized with the fundamental frequency of the pulsed laser.

In this case, the fundamental frequency and in particular the seed frequency of the pulsed laser is used in the entire system for the synchronization within the sequence. By way of example, the seed frequency serves to control a fast switch, for example an acousto-optic deflector, and hence to determine the position of the laser focus. However, the seed frequency also serves to generate the time intervals between the sequence elements. The precise tuning of the various controllable optical elements on the basis of the seed frequency consequently allows a more accurate control of the machining procedure.

If a GHz laser burst is used, the laser burst start then for example is implemented synchronously with the seed frequency.

Preferably, at least two sequences of laser pulses are introduced into the material for the purpose of machining the material, with preferably the identical sequence elements of each sequence being introduced into the material at the identical position.

What this can achieve is that the ablation tool provided by the different sequence elements acts multiple times at one position of the material to be machined and, for example, the different positions combined in the ablation tool are sequentially impinged multiple times with laser energy.

In this case, a sequence may comprise between 2 and 10 000 sequence elements, typically 25 sequence elements.

This allows the creation of complex ablation tools or sequences, by means of which the material can be machined very precisely.

What can then be achieved in the case of multiple runs through the sequence is that the ablation geometry provided by the individual segments is run through reliably and in scalable fashion with respect to the introduced energy.

The wavelength of the laser pulses can be between 200 nm and 2500 nm and/or the pulse duration can be shorter than the repetition duration of the laser pulses, in particular be between 500 ps and 10 fs, typically between 20 ps and 100 fs.

It may be particularly advantageous if the repetition rate of the laser is of the order of the switch-over time of a fast switch, for example an acousto-optic deflector, and the pulse duration of the laser beam is significantly shorter in comparison with these orders of magnitude, for example ps/fs pulses. This allows the acousto-optic deflector to individually deflect each laser pulse of the laser.

This method can moreover be used particularly advantageously for UV wavelengths since a plurality of pulses can be effectively used here for put-together beam shaping on account of the high repetition rate.

A sequence can preferably be specific to a machining phase of the material and a first sequence can be introduced into the material along a machining path during a first machining phase and a second sequence can be introduced into the material along the same machining path during a second machining phase, with the first sequence differing from the second sequence.

Specific to each machining phase may mean that each machining phase for a material is assigned a dedicated laser sequence. By way of example, a first machining phase may relate to pre-processing of the material, or a post-processing or the main processing, for example a separation process or a cutting process.

In particular, the sequence of laser pulses may be changed between the machining phases. In the process, the material need not be removed from the device and repositioned. Rather, it is sufficient to merely vary the sequence of laser pulses, with the result that various machining steps can be carried out successively without the material having to be repositioned between various workstations.

In particular, this allows one and the same position of the material to be machined multiple times and, in the process, the conventional machining phases to be correspondingly reproduced.

Consequently, the ablation tool can be guided over the workpiece and, if necessary, can be switched over in various process phases or for different geometric structures. This allows optimal implementation of high mean laser powers.

Further preferably, the spatial arrangement of the sequence elements in a machining plane can be rotated between the first sequence and the second sequence about an axis parallel to the propagation direction of the laser beam. Accordingly, the machining plane becomes a machining volume if use is made of a non-punctiform focus, that is to say a spatially extended focus. This is understood to be included in the term machining plane.

By way of example, this may mean that, during a first process phase, the spatial geometry of the ablation tool corresponds to a certain first shape and, during a second process phase, the said geometry corresponds to a second shape, with the first shape and the second shape merging into one another by rotation. In particular, this rotation is implemented around the propagation direction of the laser, with the result that the rotation produces the same effect as if the laser beam or the ablation tool has been rotated with respect to the material to be machined.

In particular, this may mean that a rotation corresponds to a re-sort of the individual focal positions since no component or module is physically rotated. In particular, re-sorting of the sequence elements may correspond to a tool change.

Such a tool change can be implemented for relatively complex geometries or more complex ablation processes with multiple traverses over the workpiece, with the temporal and spatial positioning of individual pulses within the ablation tool being modified by a switchover in the control device.

In a further preferred embodiment, a sequence may comprise a plurality of machining phases and preferably comprise roughing, smoothing and polishing, with the sequence elements arranged spatially first in a feed direction in a machining plane corresponding to a first machining phase, the sequence elements arranged subsequently corresponding to a second machining phase and the sequence elements arranged last corresponding to a last machining phase. In other words, different machining phases may be successively formed using the same ablation tool during a traverse in the feed direction over the material to be machined.

By means of a temporal variation of individual sequence element properties, it is possible to enable a plurality of process steps, for example roughing, smoothing and polishing, within a single ablation tool, that is to say within a sequence.

By way of example, leading high-energy and large-area laser pulses may represent a roughing process. By way of example, trailing laser pulses with smaller foci and more moderate energy may represent a smoothing process. By way of example, surface modifications may finally be introduced by means of GHz laser bursts, which may correspond to a polishing process.

By way of example, a leading position of the laser focus in the feed direction may bring about material ablation while a trailing position of the laser focus may smooth the cut edge, and a further, even further trailing position of the laser focus may clean the smoothed edge.

As a result, the material is able to run through various machining phases without, for example, the workstation having to be changed.

The machining process may be an ablation process and the size of the ablation opening and the cross-sectional profile of the ablation opening may be determined by the sequence of laser pulses.

The laser energy of a sequence element is at least partially deposited in the material during an ablation process, with the result that the material heats up and/or the material evaporates and is ablated in accordance with the energy distribution deposited in the material.

The energy distribution deposited in the material is given by the sequence of laser pulses, with in particular the focal position and the laser energy specifying the ultimate energy distribution. In particular, it is thus possible to define the shape of the ablation by way of a sequence of sequence elements and realize different ablation tools or ablation geometries by means of a single system, without having to carry out a physical tool change.

In this case, the ablation opening is the opening in the surface of the material during an ablation process. The cross-sectional profile is a cross section, in the plane of which the beam propagation direction is located and which extends at least partially through the material volume.

By way of example, the ablation opening may be round and the cross-sectional profile may be a triangle, with the result that the ablation overall is conical. By way of example, the ablation opening may also be square and the cross-sectional profile may be a triangle, with the result that the ablation overall is pyramidal. By way of example, the ablation opening may be round and the cross section may be a rectangle, with the result that the ablation overall is cylindrical.

The laser beam and the material can be displaced relative to one another by a feed.

By way of a feed movement, it is possible to guide the laser beam over the material or guide the material under the laser beam.

In particular, the feed movement and the introduction of the sequence or the ablation tool may occur in parallel. In addition to the corresponding sequence element property, the focal position, the feed movement along a desired feed trajectory must be taken into account in order to precisely determine the incidence location of the laser on the material.

As a result of the described combination of spatial and temporal aspects, it is possible to guide the ablation tool over the workpiece in accordance with the geometry to be machined, and adapt the said ablation tool precisely to the ablation process.

The duration of the sequence of laser pulses may be shorter than the requirement in relation to successive laser pulses during the machining, which requirement is determined by the advance between the material and the by the sequence of laser pulses.

The spatial manifestation of the ablation tool or sequence is given by the different focal positions of the sequence elements in the sequence.

In particular, the feed can also be understood as the overlaid movement for positioning the sequence elements, with the local geometry of the tool being able to be adapted to the feed if the sequence takes the overlaid feed into account.

The laser pulses of the sequence of laser pulses can be introduced into the material with delay compensation.

A delay compensation compensates for the movement of the laser pulse along the laser beam prior to the incidence on the material and the relative movement between the laser pulse during the flight and the material as a result of the feed movement. In particular, a possible deflection movement as a result of a change in the beam geometry is also taken into account. In particular, the compensation may occur in real time here.

This can ensure that the laser pulses are introduced at the envisaged incidence location, as a result of which the quality of the material machining increases.

Embodiments of the present invention also provide a device for machining a material by means of laser pulses of a pulsed laser, with successive pulses being introduced offset from one another in space and time into the material, comprising a control device, preferably an FPGA ("Field Programmable Gate Array") or an ASIC ("Application-Specific Integrated Circuit"), with at least one sequence of laser pulses being stored in a memory of the control device, the sequence comprising both the sequence elements and the sequence element properties, with the control device being communicatively connected to the pulsed laser and to a deflection system and the control device controlling the pulsed laser and the deflection system or transmitting the control commands to the pulsed laser and the deflection system.

Additionally, the control device may also be connected to the feed device in order to compensate position deviations or in order to ensure a positionally precise tool change.

Furthermore, provision can be made of a deflection system suitable for the laser energy, in particular an acousto-optic deflector unit, with the deflection system being able to bring about a deflection of the laser beam and/or a split of the laser beam into a plurality of partial laser beams and with the deflection system being able to comprise a filter system for filtering specific spatial frequencies.

Preferably, an imaging system is provided for imaging the laser pulses into the machining plane, which is preferably arranged within the material or on the surface of the material.

Furthermore, a feed device may be provided, in particular a scanner, preferably a galvanometer scanner, for moving the laser beams within the machining plane.

To realize a corresponding machining process using one ablation tool, or one sequence, the sequence element properties must be adapted from sequence element to sequence element. In particular, it is necessary to quickly vary the pulse position within a small work field, for example at the time scale of the seed frequency. This requires a controller which is synchronized with the laser seed frequency and which realizes a control.

Typically, a corresponding control device is based on an FPGA (Field Programmable Gate Array) with fast linked memories, with a plurality of sequence element properties, for example focal position, pulse energy or mode (individual pulse or laser burst), being able to be stored for each sequence element of the ablation tool or sequence. Moreover, the control device is connected to the pulsed laser system and the deflection system.

In this case, the control commands, or the execution thereof, are synchronized with the seed frequency of the laser in all connected devices, with the result that a common time base exists for all components. As a result of a correspondingly fast actuation of pulsed laser and deflection system, it is thus possible to set and modify a plurality of sequence element properties from sequence element to sequence element. By way of example, this relates to the pulse energy but also the position of the laser focus on the workpiece.

The control of the position precisely for each pulse is typically enabled by way of an acousto-optic deflector unit. In an acousto-optic deflector unit, an AC voltage is used to generate at a piezo crystal in an optically adjacent material an acoustic wave that periodically modulates the refractive index of the material. Here, the wave can propagate through the optical material, for example as a propagating wave or as a wave packet, or be in the form of a standing wave. Owing to the periodic modulation of the refractive index, a diffraction grating for an incident laser beam is realized here. An incident laser beam is diffracted at the diffraction grating and consequently deflected at least in part at an angle to its original beam propagation direction. The grating constant of the diffraction grating and hence the deflection angle in this case depend, among other things, on the wavelength of the acoustic wave and hence on the frequency of the AC voltage applied. By way of example, deflections in the x- and y-direction can thus be produced by way of a combination of two acousto-optic deflectors in a deflector unit.

By way of example, the imaging system can be a lens system, in particular a Fourier optical unit. By way of example, a Fourier optical unit can be what is known as a 4f optical unit, as a result of which it is possible to image the focal position output by the deflection system into a machining plane on or within the material. By way of example, a 4f optical unit comprises two components, with the image-side focus of the first component in the beam propagation direction coinciding with the object-side focus of the second component. This can allow an imaging of the object-side focus of the first component into the image-side focus of the second lens into the machining plane.

In this case, a component can be an optical component with imaging properties in particular, for example with a focusing or collimating effect. These include, inter alia, imaging or curved mirrors, beam shaping elements, diffractive optical elements, lenses such as converging lenses or diverging lenses, Fresnel zone plates and further free-form components.

In the ideal mathematical case, the focal planes and the corresponding planes are planes which are oriented perpendicular to the beam propagation direction and, in particular, not curved and only have a two-dimensional extent. However, in the practical implementation, the optical components lead to minor curvatures and distortions of these planes, with the result that these planes usually are at least locally curved. If the focus as described above is not punctiform, then the focus has a spatial extent, as a result of which the focal plane becomes a focal volume in which imaging of the laser beam still is sufficiently sharp, as specified below.

Therefore, reference is always made to the focal plane below, with however the accessible focal volume always also being considered, even if this is not explicitly mentioned. The explanation given above incidentally also relates to the utilized machining plane below.

In particular, positioning tolerances thus arise for the positions of the utilized components. By way of example, a positioning tolerance may be up to 20%, preferably 10%, with the result that a component that should be at a distance of for example 10 cm from a reference point still enables a sufficiently sharp image even at 9 cm and 11 cm. Accordingly, the image representations are automatically sufficiently sharp if the components are all positioned within the positioning tolerance. Moreover, a "coincidence" of two planes or two points means that the associated volumes at least partially overlap.

In particular, this also allows an object-side intermediate plane of the imaging system, in which filtering of spatial frequencies may for example occur, to be imaged onto the workpiece. Consequently, it is possible to access the machining plane in the material by an intervention in the object-side intermediate plane of the imaging optical unit and to adapt the beam shape in the machining plane.

The imaging system may provide an optical intermediate plane, for example the output of the acousto-optic deflector unit or an interposed filter optical unit for the imaging system. Then, the object-side intermediate plane is imaged onto the workpiece or the material. In the process, there may also be an enlargement or reduction in size of the ablation tool by way of the imaging system.

Additionally, the material can be moved by a feed device, with the spatial manifestation of the ablation tool, that is to say the focal positions of the individual sequence elements, being produced parallel in time by way of the acousto-optic deflector unit. In place of a feed device or in addition to a feed device, a conventional scanner, for example a galvanometer scanner, may be overlaid on the deflection system. Both the feed device and a scanner optical unit may be synchronized by way of the seed frequency, with the result that there is a common time base for the feed, the beam deflection, the beam shaping and the control of the pulsed laser.

In particular, it is also possible to feed the various position data of the feed device or the signals corresponding thereto, for example the deflection angle of the galvanometer scanner, back to the control device in order to calculate and apply a delay compensation for the tool.

More complex spatial compositions of the ablation tool can also be realized by way of the deflection system, for example multi-spot geometries, lines, but also the displacement of the focal position along the beam propagation direction, or aberration corrections of individual foci, which arise as a result of the passage through various optical elements.

Likewise, EOD systems, MEMS, TAG optical units, liquid crystal systems such as spatial light modulators, and CBC systems and diffractive optical elements or combinations thereof are also conceivable for the generation of complex beam geometries provided the performance and the switching speed appear advantageous for the corresponding application.

Preferred exemplary embodiments are described below with reference to the figures. In this case, elements that are the same, similar or have the same effect are provided with identical reference signs in the different figures, and a repeated description of these elements is dispensed with in some instances, in order to avoid redundancies.

FIG. 1A schematically shows a method for machining a material. The pulsed laser is used to provide laser pulses 10 which are focused on the material 2 to be machined in order to be partially absorbed there in such a way that this heats parts of the material and eventually ablates the latter.

The pulsed laser usually specifies the pulse length TP, the time interval TA between the laser pulses, which is also given by the repetition rate of the laser, and the energy E carried by the laser pulse. In this respect, the pulsed laser specifies a sequence S of laser pulses, with each individual laser pulse being a single sequence element which has intrinsically impressed thereon by the laser 1 the sequence element properties of pulse length, pulse energy and distance to the subsequent pulse. After the sequence S, comprising an individual laser pulse, has been introduced into the material 2, it repeats the sequence S again. In other words, all pulses and their sequence element properties of the sequence are identical.

The material is moved relative to the laser beam with a feed V while the pulsed laser provides laser pulses 10. This results in a spatial offset ΔY of the individual laser pulses 10 that have been introduced into the material, with the result that the laser energy is deposited at different workpiece positions. As a result, it is possible to carry out an ablation or cutting process.

FIG. 1B shows the various incidence locations of the laser pulses 10 from FIG. 1A on the material 2. The laser pulses 10 are introduced into the material 2 along a straight line as a result of the relative feed movement V. The incidence location is displaced by ΔY=V TA between each pulse.

Consequently, in the method, the spatial position of the laser focus on the material 2 is only determined by the feed movement V and the energy input over time is only determined by the fixed settings of the pulsed laser.

Figures 2A, 2B, 2C:
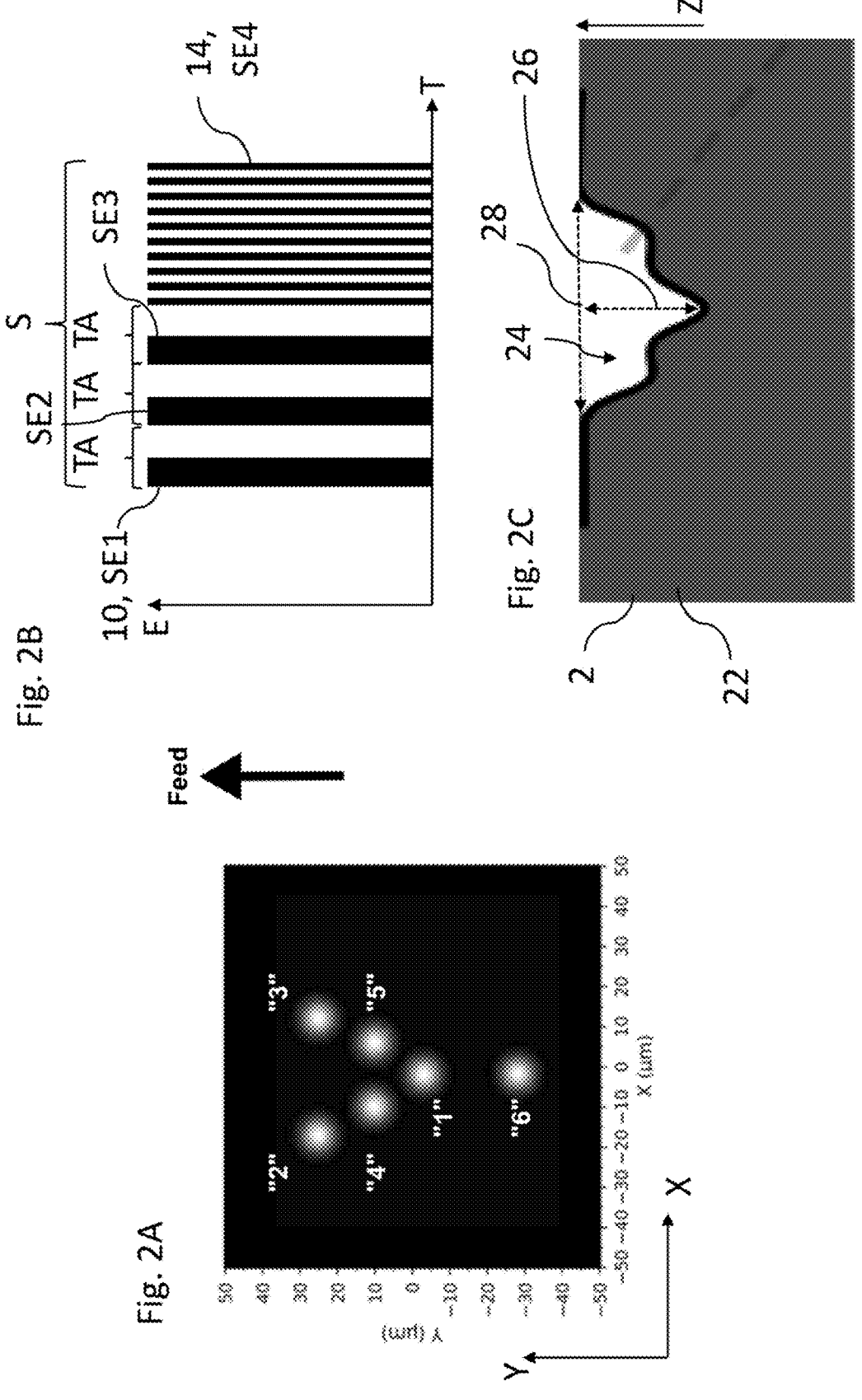
FIGS. 2A-2C show a schematic representation of a method according to some embodiments.

The method proposed here is schematically indicated in FIG. 2A. In this case, the material is machined by means of a sequence S of laser pulses. Here, the sequence S of the laser pulses comprises at least two sequence elements SE, which in turn are each formed from a laser pulse, a specific succession of individual laser pulses or a burst of laser pulses in each case. For each sequence element, the position of the laser focus is adapted precisely for each sequence element. Hence, at least two different positions of the laser focus are provided in a sequence.

Therefore, a sequence S may form what is known as an ablation tool by means of the different positions of the laser focus of the individual sequence elements, the said ablation tool forming an appropriate form or shape which may serve for machining the material, virtually like a stamp with specified machining positions arranged fixedly with respect to one another.

In this case, the position of the laser focus, as a sequence element property, is adapted precisely for each sequence element, with the adaptation taking place in the plane perpendicular to the propagation direction of the laser beam. The form of the positions of the laser focus "1" to "6" depicted in FIG. 2A is shown in the cross section relative to the beam propagation direction of the laser beam. In a sense, FIG. 2A shows the incidence locations of the individual laser pulses after running through a complete sequence in the case of a non-displaced material.

The sequence S or the ablation tool can consequently be put together from a plurality of sequence elements SE, with the energy deposition within this ablation tool not necessarily being effected simultaneously, but being able to be adjusted in temporally exact fashion.

FIG. 2B shows a temporal embodiment of a sequence S and FIG. 2C shows the ablation cross-sectional geometry of the sequence S in a material 2 resulting therefrom.

By way of example, the first sequence element SE1 in this case is an individual laser pulse 10, which is emitted into the material at a focal position "1" at the start of the sequence S. This is followed by a time interval TA before the second sequence element SE2. By way of example, the second sequence element SE2 is also an individual laser pulse 10, with the laser beam formed by the second laser pulse 10 being split into two different partial laser beams, for example by way of a deflection system or beam splitter optical unit. Consequently, the second sequence element SE2 has a different beam geometry vis-à-vis the first sequence element SE1. The laser pulse 10, which is divided into the two partial laser beams, is accordingly introduced synchronously into the material at the positions "2" and "3".

This is followed by a time interval TA before the third sequence element SE3. The third sequence element SE3 is an individual laser pulse 10, with the laser beam formed by the third laser pulse being once again split into two different partial laser beams. Consequently, the third sequence element SE3 has a different beam geometry vis-à-vis the first sequence element SE1 and the second sequence element SE2. The laser pulse 10 is introduced synchronously into the material 2 at the positions "4" and "5". This is followed by a time interval TA before the fourth sequence element SE4. In this case, the fourth sequence element SE4 is schematically provided as a GHz laser burst 14, which is then introduced into the material 2 at the position "6".

As a result of the partly synchronous introduction of the partial laser beams, it is possible to optimize the heat accumulation as a result of the ablation tool since the time interval between the successive pulses can be maximized as a result of the synchronized introduction. The heat accumulation is reduced by virtue of the fact that the material is given more time to cool off between the pulses.

In another embodiment, the opposite effect can also be achieved by the introduction of the partial laser beams, specifically the targeted and fast heating of a specified, extended region of the material.

The shape of the ablation tool and the shape of the energy distribution actually introduced into the material may differ, depending on the magnitude of the feed and the time intervals between the sequence elements. Overall, the distortion of the ablation tool during the machining process can be avoided by the feed with what is known as delay compensation, as will be shown below.

During the machining process, the ablation tool of FIG. 2A produces a specifically shaped ablation with ablation opening 24 and cross section 22. Such a cross section 22 is shown in FIG. 2C, for example. The ablation opening 24 has a large diameter 28 at the surface of the material, with the diameter 28 tapering with increasing material depth 26.

The shape of the cross section 22 of the ablation is rendered understandable by the various focal positions in FIG. 2A, where energy has been introduced into the material. The diameter 28 of the ablation opening 24 is determined by the spatial distance between the focal positions "2" and "3". By contrast, in the centre of the ablation, material 2 is ablated at the focal positions "1", "4", "5" and "6", with the result that the energy density deposited there is significantly greater. What arises as a consequence is that the ablation is significantly deeper in this region.

Consequently, as a result of the described combination of spatial and temporal sequence element properties in FIGS. 2A and 2B, the ablation tool can realize a precise ablation process.

FIG. 3A shows a further embodiment of the proposed method. The sequence of sequence elements SE is introduced into the material 2 within a certain period of time TS. Within the period of time TS in this case, a certain amount of time may be mainly destined for the introduction of energy into the material, but the period of time TS may also have phases during which no energy may be introduced into the material. In particular, the phase during which no energy is introduced into the material is decisively determined by the determined time interval between the last sequence element SE and the next sequence element SE or the first sequence element SE1 of the repeated sequence S.

FIG. 3B shows a further ablation tool, with the position of the laser focus of the sequence elements SE of the sequence S being adapted precisely for each pulse. The ablation tool has different focal positions in the plane perpendicular to the beam propagation direction, but the ablation tool also has a focal position, position "1", which is displaced along the beam propagation direction. As a result, the focal diameter in the machining plane appears to be larger, but the intensity in the focal position is less.

Moreover, FIG. 3B shows how the ablation tool overall is displaced relative to the material surface by a feed V. This may also yield different tools depending on the order of the sequence elements.

If the feed V during the time TS is significantly less than the spatial extent of the ablation tool, then the distribution of the energy deposited in the material 2 may correspond to the distribution of the ablation tool. In the case of high feed speeds, a distortion of the ablation tool can be avoided by way of a delay compensation.

Figure 4:
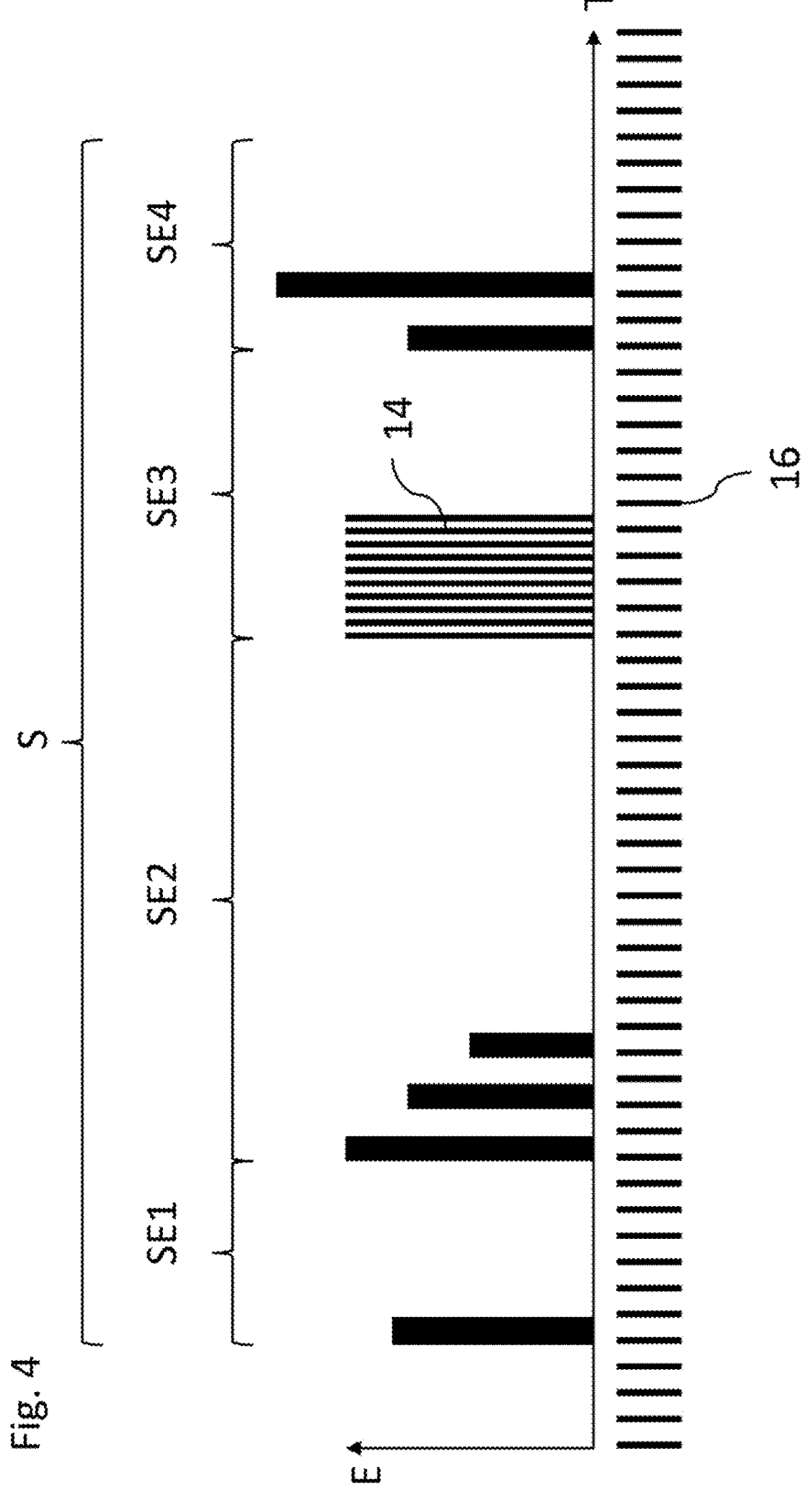
FIG. 4 shows a schematic representation of temporal dependencies in an ablation tool or in a sequence according to some embodiments.

FIG. 4 shows a possible pulse composition of a further ablation tool. In this case, a plurality of laser pulses 10 or sequence elements SE with different pulse energies or time intervals, or sequence element properties, are combined. By way of example, a sequence may comprise between 2 and 10 000 sequence elements. In this case, the individual pulse duration is in the picosecond or femtosecond range, in particular between 500 ps and 10 fs, typically between 20 ps and 100 fs, with the wavelength of the laser pulses being between 200 nm and 2500 nm.

The sequence defining the ablation tool initially comprises a first sequence element SE1, which is an individual laser pulse 10, followed by a second sequence element SE2, which is a specific succession of laser pulses 10, followed by a third sequence element SE3, which is a GHz laser burst 14, and followed by a fourth sequence element SE4, which again is a specific succession of laser pulses.

In this case, all sequence elements of the sequence start synchronously with the seed frequency of the laser. In particular, it is not mandatory for each sequence element to end synchronously with the seed frequency of the laser. This is visible for the sequence element SE3, in particular, where the end of the energy introduction by way of the GHz laser burst is situated between the clock pulses of the seed frequency.

The sequence element SE1 comprises merely of an individual laser pulse. The energy of the laser pulse, the time interval before the subsequent sequence element and a possible beam geometry are defined by the sequence element properties.

The second sequence element comprises a specific succession of laser pulses, for example three laser pulses. In the case of the second sequence element, the pulse energy of the laser pulses successively reduces in the sequence element. In principle, it is possible to consider the laser pulses of the specific successions of laser pulses to be individual sequence elements and assign these dedicated sequence element properties. However, by grouping such sequence elements, it is possible to fixedly define, and repeatedly reuse, specific forms of energy introduction. The last pulse of the sequence element is subsequently followed by a time interval to the next sequence element, this time interval being significantly longer than the interval between the pulses within the sequence element.

The third sequence element SE3 is a GHz laser burst and it is finally followed by the fourth sequence element SE4, which comprises a further specific succession of laser pulses, with the laser energy successively increasing.

In addition to the temporal succession of the sequence elements, each sequence element can also be assigned a beam geometry, for example in such a way that the beam profiles of the various sequence elements are all different. In particular, all sequence elements are adaptable, precisely for each sequence element, and so each sequence element of the sequence can be assigned individual sequence element properties.

FIG. 5 shows a tool change of an ablation tool in exemplary fashion. The ablation tool comprises a total of ten different positions of the laser focus, which are arranged within a triangle. During a tool change, the positioning of individual sequence elements in time and space is modified within the ablation tool by a control switchover. By way of example, a control switchover may comprise the ablation tool as a whole being rotated about the beam propagation direction by means of a suitable optical unit.

Figures 5A, 5B:
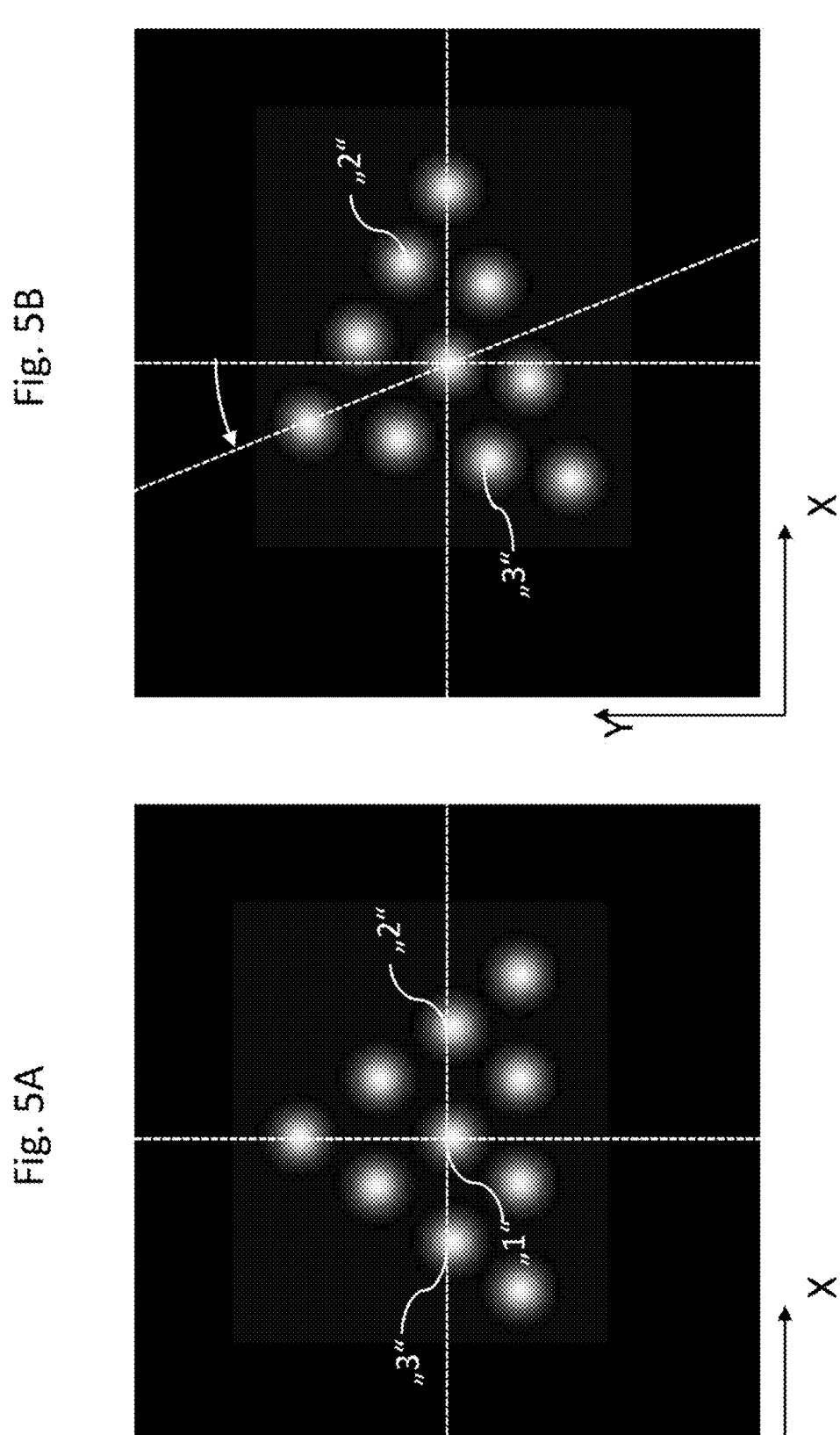
FIGS. 5A and 5B show a schematic representation of a rotated ablation tool according to some embodiments.

By way of example, a rotation of the ablation tool is one option for varying the spatial arrangement of the focal positions. Here, in FIG. 5B, the ablation tool of FIG. 5A is rotated through an angle about the beam propagation direction. By way of example, the focal position "1" is obtained when the laser beam 12 is not deflected from its beam propagation direction. A rotation therefore occurs about the focal position "1".

From FIG. 5A, it is evident that the focal positions "2" and "3" are arranged at the same Y-height relative to the focal position "1". By way of example, the energy of the laser pulse can be introduced synchronously into the focal positions "2" and "3" when the laser beam 12 is split accordingly into partial beams.

In FIG. 5B, the energy of the laser pulse still is introduced synchronously into the focal positions "2" and "3", but the ablation tool is rotated about the focal position "1" such that the laser pulse energy is introduced into the focal position "2" spatially in front of the focal position "3". As a result, it is possible to form a temperature gradient, for example, which possesses a specific ablation function or machining function.

However, such a rotation is typically applied with an overlaid feed in order to guide the energy deposition over the material along a complex trajectory.

In particular, it is evident that the positions of the laser foci are effectively reordered by a rotation of the ablation tool. In fact, no optical unit or optical module is rotated during the apparent rotation procedure, only the deflection and beam shaping is adapted in accordance with a rotation.

Figure 6:
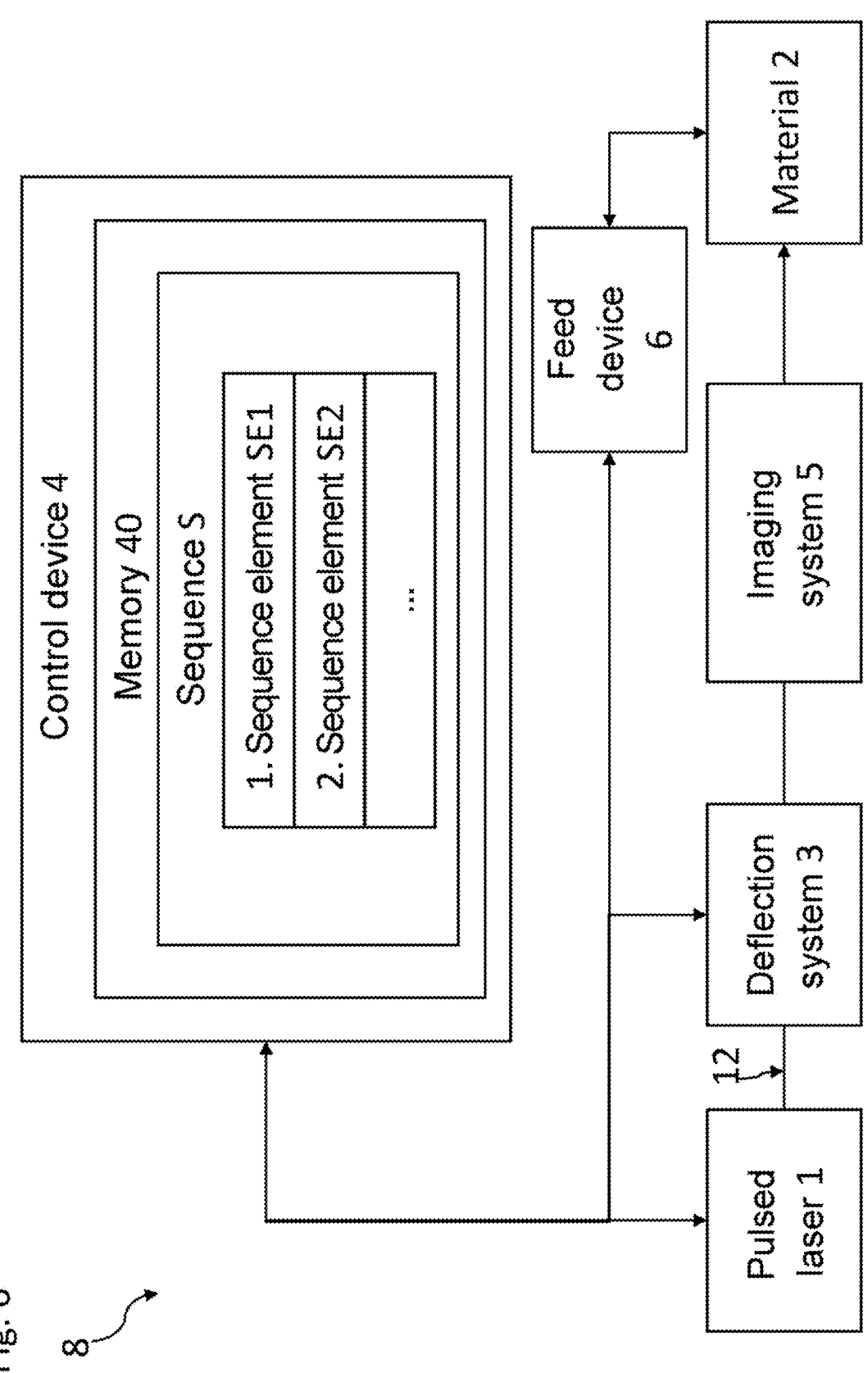
FIG. 6 shows a schematic representation of the device for carrying out the method according to some embodiments.

FIG. 6 shows a schematic structure of a device 8 for machining a material, the said device being able to be used to carry out the above-described machining method. The control device 4, for example an FPGA, comprises a memory 40 or can be linked to a memory, in which a sequence S with the sequence elements SE is stored together with the sequence element properties. Distributed memory systems are also possible, with it preferably being possible for a fast linked internal memory in the FPGA to cooperate with a slower linked RAM module.

The memory 40 is advantageous inasmuch as various multi-segment tools or sequences can be stored in the control device 4, with the result that there can be a fast switchover between the various processes in the case of successive machining of the material 2 using different process steps.

The control device 4 is communicatively connected to a pulsed laser 1 and can access the seed frequency of the laser, for example, as a result. As a result of the communicative connection of the control device 4 to the pulsed laser 1, it is further possible for the control device 4 to transmit the laser-specific sequence element properties to the pulsed laser 1 and control the pulse release. The laser-specific sequence element properties are, for example, the pulse energy or else the pulse spacing or the mode of operation such as, for example, the individual pulse or GHz laser burst mode of operation of the laser.

In addition to the pulsed laser 1, the control device 4 is communicatively connected to the deflection system 3. The deflection system 3 provides for a deflection of the laser beam 12 or a split of the laser beam 12 into a plurality of partial beams. However, the deflection system can also enable a split and/or a shaping and/or a longitudinal focal displacement and/or a transverse positioning of the laser beam and optionally cooperate with the imaging system 5 to this end. The deflection system 3 is synchronized with the pulsed laser 1 via the control device 4 such that each laser pulse 10 of the pulsed laser 1 is impressed with an individual focal position by way of the deflection system 3. Consequently, the connection of the pulsed laser 1 to the deflection system 3 and the control device 4 enables a control of the sequence elements SE or the sequence element properties precisely for each pulse and hence precisely for each sequence element.

The focal positions made available by the deflection system 3 are imaged into the machining plane 20 of the material 2 by the imaging system 5. By way of example, the imaging system 5 can be a lens system. However, the imaging system 5 may also contain filter elements. Then, the sequence elements SE made available by the pulsed laser 1 and processed by the deflection system 3 are introduced into the machining plane 20 of the material 2 with sequence element properties adapted precisely for each sequence element and the said sequence elements bring about machining there.

While the pulsed laser 1 provides the laser pulses 10, the material 2 can move with a feed V relative to the laser beam or beams 12. A feed device 6 is embodied to this end, the latter for example in the form of a scanner optical unit also being able to be integrated into the imaging system 5. In particular, the feed device can be configured for delay compensation and can be connected to the control device for this purpose.

Figures 7A, 7B:
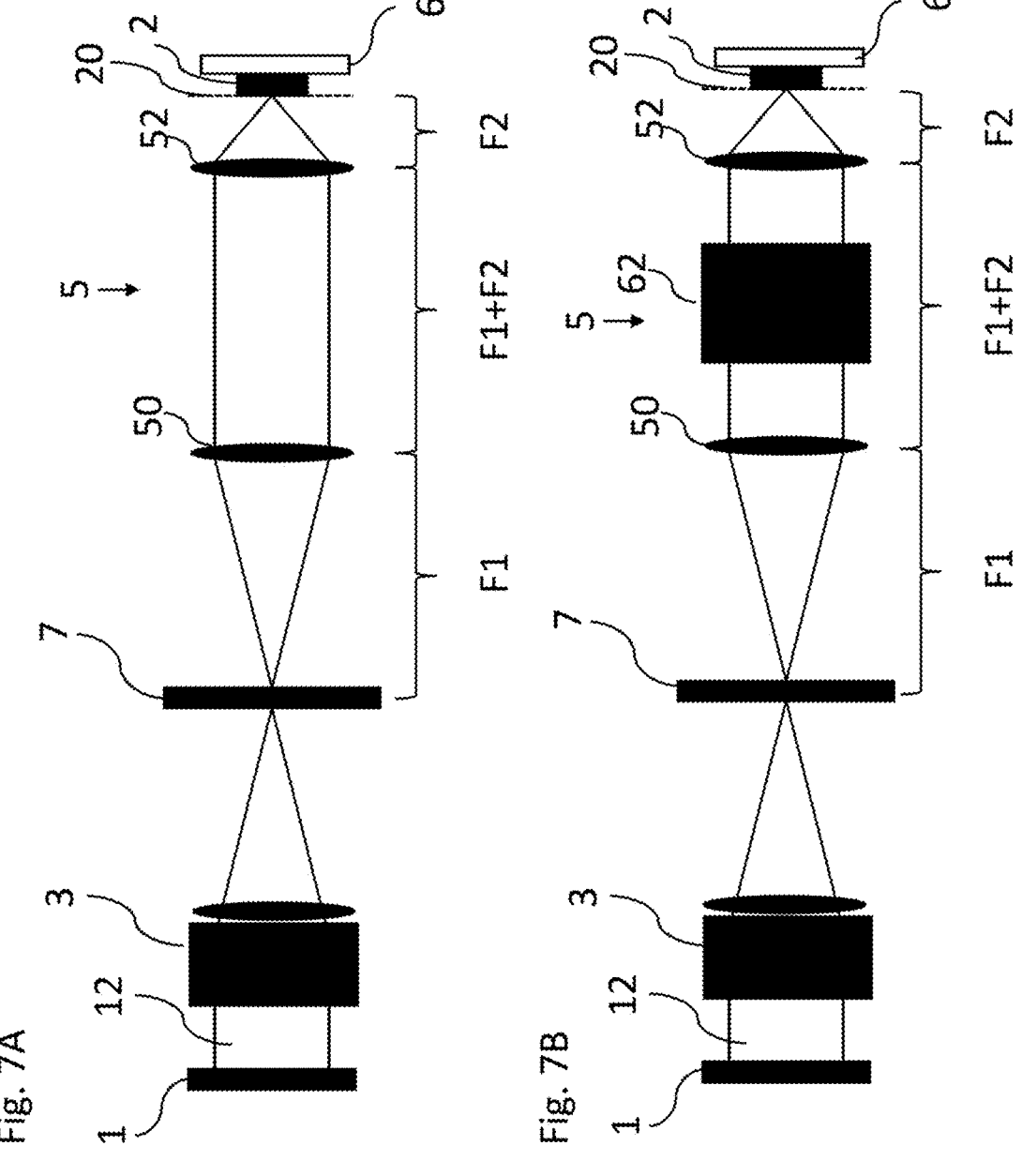
FIGS. 7A-7C show schematic representations of the optical path of a device for carrying out the method according to some embodiments.

FIG. 7A schematically shows a part of the device 8 for ablating a material 2. In this case, the pulsed laser 1 provides a laser beam 12, in which the laser pulses 10 of the laser 1 propagate.

In the embodiments shown, the laser beam 12 is typically guided by a deflection system 3, which for example is an acousto-optic deflector unit. The laser beam 12 is focused by means of an adjacent lens and is subsequently optionally guided through a filter element 7, where the beam profile of the laser beam 12 can be manipulated and optimized for the machining process. In particular, this makes it possible to filter out spatial frequencies, with the result that the laser pulses 10 imaged onto the material 2 have a high contrast.

Finally, the image of the filter element 7 is imaged onto or into the material 2 by the imaging system 5. By way of example, this can be implemented by virtue of the imaging system being a Fourier optical unit, for instance. Thus, overall, the ablation tool in this case is produced by the deflection system 3 in combination with the filter element 7.

In this case, the filter element 7 is placed upstream of the first lens 50 in the beam direction, at a distance corresponding to the focal length F1 of the first lens. A second lens 52 is situated downstream of the first lens 50 in the beam direction. The image-side focus of the first lens 50 and the object-side focus of the second lens 52 are located between the first lens 50 and the second lens 52. Both foci coincide, with the result that the spacing of the two lenses 50, 52 corresponds to the sum of the focal lengths F1+F2. The machining plane 20 is situated in or on the material 2 downstream of the second lens 52. The machining plane 20 is arranged at a distance F2 from the lens 52, the said distance corresponding to the focal length of the second lens 52.

The ablation tool is imaged into the machining plane 20 by the imaging system. In this case, imaging can also be implemented with a size reduction, for example with between a 2- and 500-fold reduction, in particular with a 25-fold reduction. As a result of a reduction in size, it is possible in particular to realize an ablation on a smaller size scale.

The laser pulses 10 of the laser beam 1 are incident on the material in the machining plane and are at least partially absorbed by the material 2. As a result, it is possible to heat the material 2 and/or change it into a temporary plasma state, and thereby partially evaporate and hence ablate the said material. During the machining procedure, the ablation tool can be moved relative to the material 2 by means of the feed device 7.

A scanner, for example a galvanometer scanner 62, can be used between the lenses 50, 52 of the imaging system 5 instead of a workpiece 2 that is moved by means of the feed device 6, or in addition to the feed device 6, as shown in FIG. 7B. As a result of the fast reaction time of the galvanometer scanner 62, it is consequently possible to carry out particularly precise machining processes. In particular, position and/or angle information relating to the galvanometer scanner 62 and/or the feed device 6 can be recorded at a high measurement rate by way of appropriate encoders and can be transmitted to the control device at a high speed, and can be used to carry out a delay compensation by way of the deflection system 3 and monitor the tool composition.

Figure 7C:
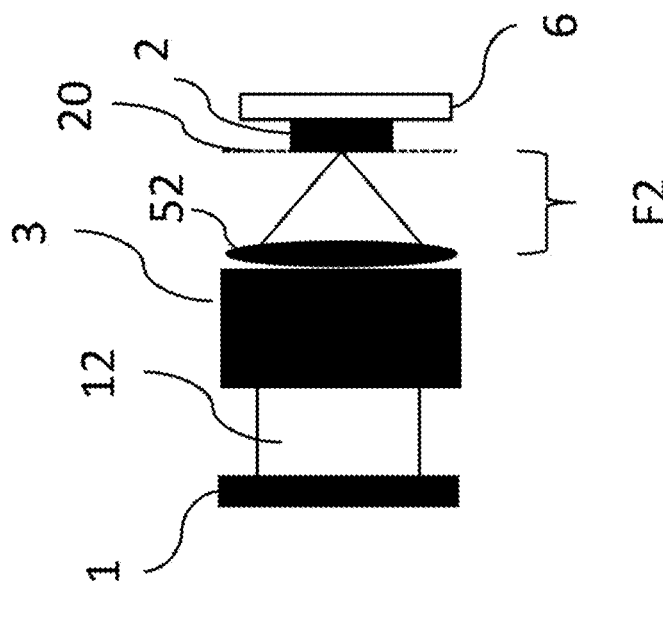

FIG. 7C shows a further embodiment, in which the deflection system 3 is focused directly on the material 2 by way of the lens 52. By way of example, the deflection system 3 can be a micro-electromechanical system (MEMS). Provided no filtering and no scanners are required, it is consequently possible to save installation space in order to realize a compact device.

Insofar as applicable, all individual features presented in the exemplary embodiments can be combined with one another and/or interchanged, without departing from the scope of the invention.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Pulsed laser
10 Laser pulses
12 Laser beam
120 Partial laser beams
122 Partial laser beams
14 Laser burst
16 Fundamental frequency
2 Material
20 Machining plane
22 Cross section
24 Ablation opening
26 Ablation depth
28 Diameter
3 Deflection system
4 Control device
40 Memory
5 Imaging system
50 First lens
52 Second lens
6 Feed device
62 Galvanometer scanner
7 Filter element
8 Device
TP Pulse length
TA Time interval between the laser pulses
T Time
E Energy of the laser pulse
S Sequence
SE Sequence element

The invention claimed is:

1. A method for machining a material using a pulsed laser, the method comprising:
   introducing a sequence of laser pulses into the material for machining the material, and
   synchronizing a start of each sequence with a fundamental frequency of the laser,
   wherein the sequence of laser pulses comprises at least two different sequence elements that are offset from one another in space and time,
   wherein each sequence element comprises an individual laser pulse, a specific succession of individual laser pulses, or a burst of laser pulses,
   wherein sequence element properties are impressed on each sequence element, and
   wherein the sequence element properties comprise a position of a laser focus of a respective sequence element, and
   the position of the laser focus of each sequence element of the sequence is adapted for each sequence element.

2. The method according to claim 1, wherein the sequence element properties comprise the pulse energy and/or the intensity, and the pulse energy and/or the intensity of each sequence element of the sequence is adapted for each sequence element.

3. The method according to claim 1, wherein the sequence element properties comprise a variation of a pulse profile of a sequence element of the at least two different sequence elements over time.

4. The method according to claim 1, wherein the sequence element properties comprise a time interval between a sequence element of the at least two different sequence elements and a preceding and/or subsequent sequence element, and the time interval is adapted for each sequence element of the sequence.

5. The method according to claim 4, wherein a minimum time interval and/or time interval variation is given by the fundamental frequency of the laser.

6. The method according to claim 1, wherein the sequence element properties comprise beam geometry, and the beam geometry is adapted for each sequence element.

7. The method according to claim 6, wherein a laser beam formed by the laser pulses of a sequence element of the at least two different sequence elements is split into at least two partial laser beams, with the partial laser beams being introduced into the material synchronously with respect to one another.

8. The method according to claim 6, wherein a laser beam formed by the laser pulses of a sequence element of the at least two different sequence elements is split into at least two partial laser beams, with the partial laser beams being imaged next to one another and spaced apart from one another along a line.

9. The method according to claim 1, wherein the sequence element properties are adapted for each laser pulse for each sequence element, with the adaptation of the sequence element properties being synchronized with the fundamental frequency of the laser.

10. The method according to claim 1, wherein at least two sequences of laser pulses are introduced into the material for machining the material, with identical sequence elements of each sequence being introduced into the material at an identical position.

11. The method according to claim 1, wherein a wavelength of the laser pulses is between 200 nm and 2500 nm and/or a pulse duration is shorter than a repetition duration of the laser pulses.

12. The method according to claim 1, wherein each sequence comprises between 2 and 10 000 sequence elements.

13. The method according to claim 12, wherein each sequence comprises 25 sequence elements.

14. The method according to claim 1, wherein the sequence is specific to a machining phase of the material, and a first sequence is introduced into the material along a machining path during a first machining phase and a second sequence is introduced into the material along the machining path during a second machining phase, with the first sequence differing from the second sequence.

15. The method according to claim 14, wherein a spatial arrangement of the at least two different sequence elements in a machining plane is rotated between the first sequence and the second sequence about an axis parallel to a propagation direction of the laser beam.

16. The method according to claim 1, wherein a sequence comprises a plurality of machining phases, wherein the sequence elements are arranged spatially first in a feed direction in a machining plane corresponding to a first machining phase, the sequence elements are arranged subsequently corresponding to a second machining phase, and the sequence elements are arranged last corresponding to a last machining phase.

17. The method according to claim 1, wherein the laser pulses of the sequence are introduced into the material so as to compensate for delay associated with movement of the laser pulses along a laser beam and relative movement between the laser pulses and the material.

18. A device for machining a material using laser pulses of a pulsed laser, with successive laser pulses being introduced offset from one another in space and time into the material to be machined, the device comprising:

a control device comprising a memory for storing at least one sequence, each sequence comprising sequence elements and sequence element properties of each sequence element, wherein the control device is communicatively connected to the pulsed laser and to a deflection system, wherein the control device is configured to:

control the pulsed laser and the deflection system or to transmit the control commands to the pulsed laser and the deflection system to introduce a sequence of laser pulses into the material for machining the material, and synchronize a start of each sequence of laser pulses with a fundamental frequency of the pulsed laser, wherein the sequence of laser pulses comprises at least two different sequence elements that are offset from one another in space and time, wherein each sequence element comprises an individual laser pulse, a specific succession of individual laser pulses, or a burst of laser pulses, wherein sequence element properties are impressed on each sequence element, wherein the sequence element properties comprise a position of a laser focus of a respective sequence element, and wherein the position of the laser focus of each sequence element of the sequence of laser pulses is adapted for each sequence element.

19. The device according to claim 18, wherein the deflection system comprises an acousto-optic deflector unit and/or the deflection system is configured to bring about spatial deflection of a laser beam and/or a split of the laser beam into a plurality of partial laser beams and/or the deflection system comprises a filter system for filtering spatial frequencies.

20. The device according to claim 18, further comprising:

an imaging system for imaging the laser pulses and/or a scanner for moving the laser beam in a machining plane of the material.

* * * * *